United States Patent [19]

Uemura

[11] Patent Number: 4,627,041
[45] Date of Patent: Dec. 2, 1986

[54] AUTOMATIC FOCUSING SYSTEM FOR READING INFORMATION FROM A RECORDING MEDIUM

[75] Inventor: Masaru Uemura, Amagasaki, Japan
[73] Assignee: Mitsubishi Denki Kabushiki Kaisha, Tokyo, Japan
[21] Appl. No.: 476,872
[22] PCT Filed: Oct. 8, 1982
[86] PCT No.: PCT/JP82/00403
 § 371 Date: Mar. 15, 1983
 § 102(e) Date: Mar. 15, 1983

[30] Foreign Application Priority Data

Oct. 8, 1981 [JP] Japan .................. 56-161492

[51] Int. Cl.$^4$ ........................... G11B 7/00
[52] U.S. Cl. ........................... 369/45
[58] Field of Search .................. 369/44–46, 369/118; 250/201 DF

[56] References Cited
U.S. PATENT DOCUMENTS

| | | | |
|---|---|---|---|
| 3,974,327 | 8/1976 | Van Dijk | 369/45 |
| 3,976,828 | 8/1976 | Janssen | 369/45 |
| 4,123,652 | 10/1978 | Bouwhuis | 369/45 X |
| 4,128,847 | 12/1978 | Roullet et al. | 369/45 |
| 4,280,215 | 7/1981 | Okano | 369/45 |
| 4,286,147 | 8/1981 | Tsuboi et al. | 369/45 X |
| 4,337,532 | 6/1982 | Oprandi et al. | 369/45 |
| 4,357,696 | 11/1982 | Bierhoff et al. | 250/201 DF X |
| 4,418,405 | 11/1983 | Barnette et al. | 369/45 |

*Primary Examiner*—Aristotelis M. Psitos
*Attorney, Agent, or Firm*—Bernard, Rothwell & Brown

[57] ABSTRACT

In an equipment for reading out information from a recording medium (9) having a flat reflection surface such as a video disk, the present invention relates to an automatic focusing system for preventing an objective lens system in an automatic focusing apparatus which functions to set the distance between the recording medium (9) and an objective lens (10) at an optimum value, from striking against the recording medium (9). In an automatic focusing apparatus having the objective lens (10) for condensing light incident on the recording medium (9) and its reflected light and an electromagnetic drive means (7) for driving the objective lens in the direction of an optical axis, the automatic focusing system is provided with means (12) (13) (14) (15) for applying a driving signal to the electromagnetic drive means (7) until the automatic focusing apparatus starts its normal operation, which driving signal comprises a triangular wave signal of low frequency and a high frequency signal to which the electromagnetic drive means cannot respond, said low and high frequency signals being lapped over each other, whereby an automatic focus control is made after movement of the objective lens (10) to a predetermined region to prevent collision of the objective lens (10) with the medium (9) without provision of a precise adjusting mechanism.

4 Claims, 7 Drawing Figures

AUTOMATIC FOCUSING SYSTEM FOR READING INFORMATION FROM A RECORDING MEDIUM

FIELD OF ART

The present invention relates to an automatic focusing system in an equipment for reading out information from a recording medium having a flat reflection surface such as a video disk, whereby an objective lens system and the recording medium are prevented from striking against each other at the time of an initial focusing of an automatic focusing apparatus which functions to set the distance between the recording medium and an objective lens at an optimum value.

BACKGROUND ART

Heretofore, there has been proposed an automatic focusing system wherein a change in state of a reflected light is detected as a change in an electrical signal and an objective lens driving unit is controlled on the basis of such electrical signal.

However, it is necessary to prevent an objective lens system from being accelerated and striking against a recording medium at the time of an initial operation of an automatic focusing apparatus, and in this regard there has been known a method wherein the entire objective lens system is moved up to a focal position between an objective lens and the recording medium by using a precise screw feed mechanism or the like and thereafter the automatic focusing apparatus is switched ON, or a method wherein when the distance between an objective lens and a recording medium decreases, an objective lens system is braked at a suitable timing, as shown in Japanese Patent Publication No. 1683/1979.

DISCLOSURE OF THE INVENTION

It is the object of the present invention to provide an automatic focusing system wherein a separate control signal is provided in addition to a focus error signal at the time of an initial focusing of an automatic focus control apparatus whereby a focusing is effected without collision of an objective lens with a recording medium.

BEST FORM FOR PRACTICING THE INVENTION

Figure 1:
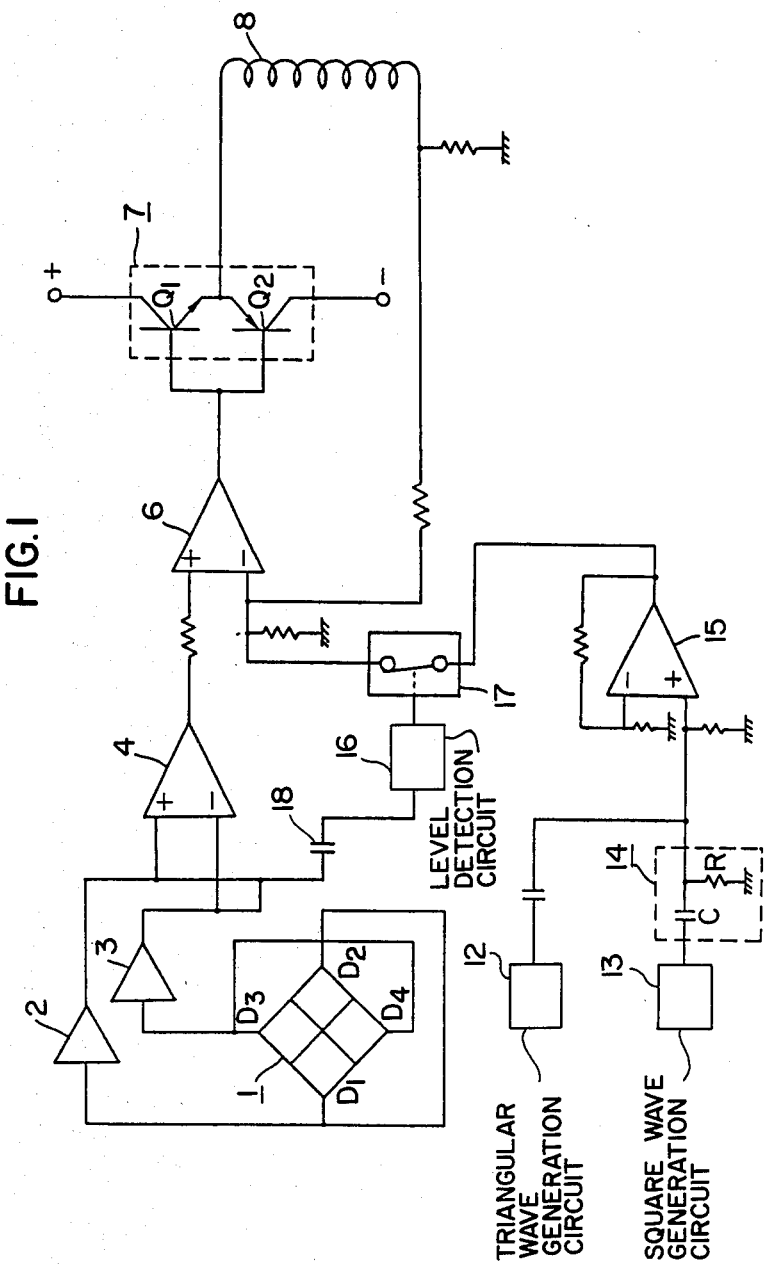
FIG. 1 is a functional circuit diagram showing the automatic focusing system of the present invention.

Referring to FIG. 1, there is shown the automatic focusing system of the present invention, in which the reference numeral 1 denotes a photo detector composed of four photo detectors $D_1$, $D_2$, $D_3$ and $D_4$ for receiving light reflected and modulated by a recording medium; numerals 2 and 3 denote current-voltage conversion amplifiers for the summed outputs of diode pair $D_1$ and $D_2$ and the diode pair $D_3$ and $D_4$, respectively; 4 a differential amplifier; 6 an amplifier circuit; and 7 a drive circuit which is composed of transistors $Q_1$ and $Q_2$ and which causes a current flow in a coil 8 integrally with an objective lens.

The numeral 12 denotes a triangular wave generation circuit for generating a triangular wave having a low frequency of 1 Hz or so; 13 a square wave generation circuit for generating a square wave of 50% duty ratio having a high frequency of 20 kHz or so to which an objective lens system does not respond; 14 a differentiation circuit consisting of a capacitor C and a resistor R; 15 an addition circuit; 16 a level detection circuit consisting of mean value detecting circuit and an amplifier operated by the AC component of the summed outputs of of the amplifiers 2 and 3 passing through capacitance 18; and 17 a relay switch.

Figure 4:
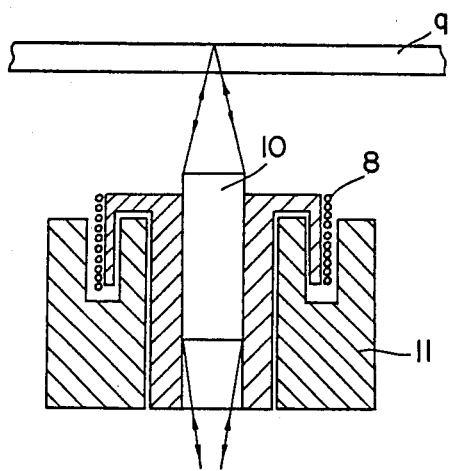
FIG. 4 is a view showing an objective lens system.

The objective lens 10 and the coil 8 are disposed as shown in FIG. 4, in which when current flows in the coil 8 integral with the objective lens 10, the objective lens 10 is moved in a direction away from a recording medium 9 by virtue of an electromagnetic force acting between the coil 8 and a permanent magnet 11 and settles down in a focal position.

Figure 2A:
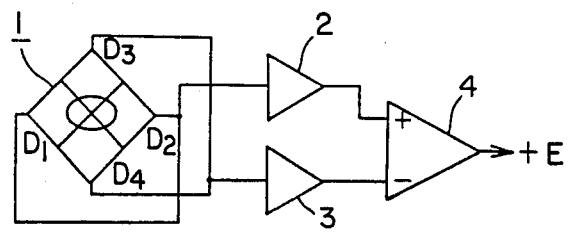
FIG. 2 consisting of (a)-(c) is a view showing the relationship between the shape of a reflected light condensed on a photo detector and a focus error voltage.
Figure 2B:
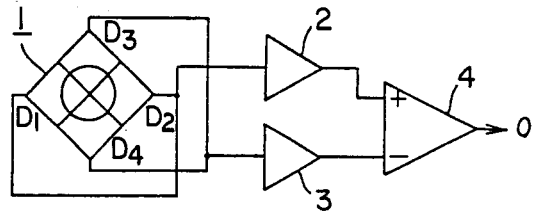
Figure 2C:
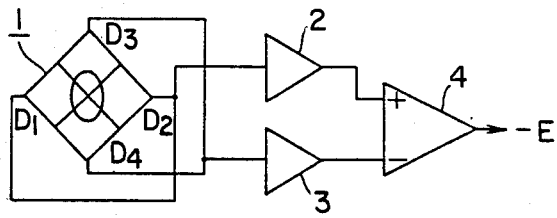
Figure 3:
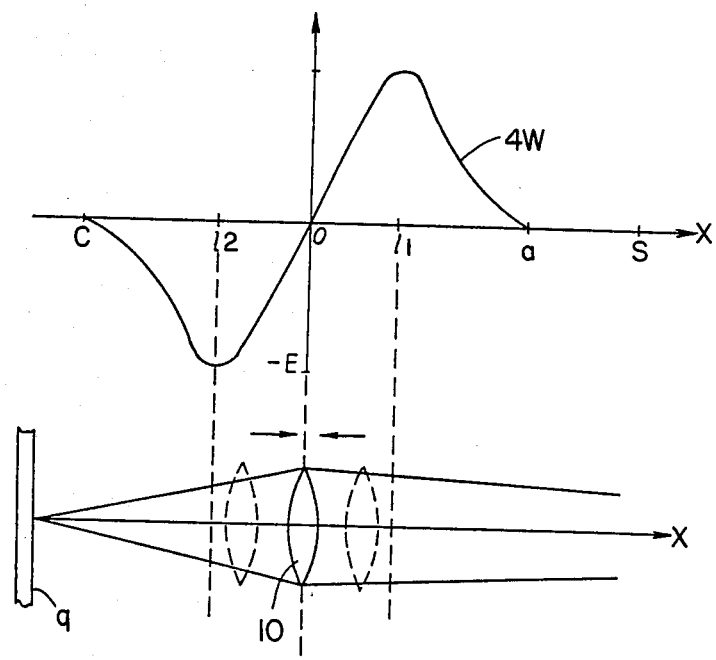
FIG. 3 is a view showing the relationship between a deviation from a focal position of a recording medium and an objective lens and a focus error voltage.

Operation will now be described. The optical system used herein is designed so that a light reflected from the recording medium and again condensed by the objective lens onto the photo detector 1 assumes such shapes as shown in FIGS. 2(a), (b) and (c) according to the distance between the recording medium and the objective lens. More particularly, the case where the distance between the recording medium and the objective lens is too long corresponds to FIG. 2(a), the case where such distance is in the focal position corresponds to FIG. 2(b), and the case where such distance is too short corresponds to FIG. 2(c). Consequently, a focus error voltage obtained in the differential amplifier 4 is positive (+E) in the case of FIG. 2(a), zero (0) in the case of FIG. 2(b) and negative (−E) in the case of FIG. 2(c). Curve 4W in FIG. 3 shows this relation of focus error voltage vs distance between the recording medium 9 and the objective lens 10. Points a and c define end points of a normal range of lens positions in which the automatic focus control can operate to move the lens to the focal position o. Deviation of the objective lens from the focal position is plotted along the X axis and the focus error voltage is plotted along the Y axis. More particularly, in FIG. 3, point 0 indicates the case where the recording medium 9 and the objective lens 10 are in the focal position; point $l_1$ indicates the case where the distance between the recording medium 9 and the objective lens 10 being too long; and point $l_2$ indicates the case where such distance is too short.

Assuming that the objective lens 10 is located at point S shown in FIG. 3 deviating from the focal position, a focus error voltage is not produced at this point even if an automatic focus control loop is closed, and in order for a focusing to be performed it is necessary to move the objective lens up to the region where a focus error voltage is produced. It is possible to let the objective lens 10 approach the recording medium 9 up to the region where a focus error voltage is produced, for example, by supplying a certain d.c. voltage to an input terminal of the amplifier circuit 6 to cause a d.c. current flow in the coil 8. In this case, however, since the gain of the automatic focus control loop is high, the objective lens 10 in an accelerated state approaches the recording medium 9 up to the region where a focus error voltage is produced, and strikes against the recording medium 9 without being completely decelerated in the section between point 0 and point c. Therefore, this means is not applicable.

Figure 5:
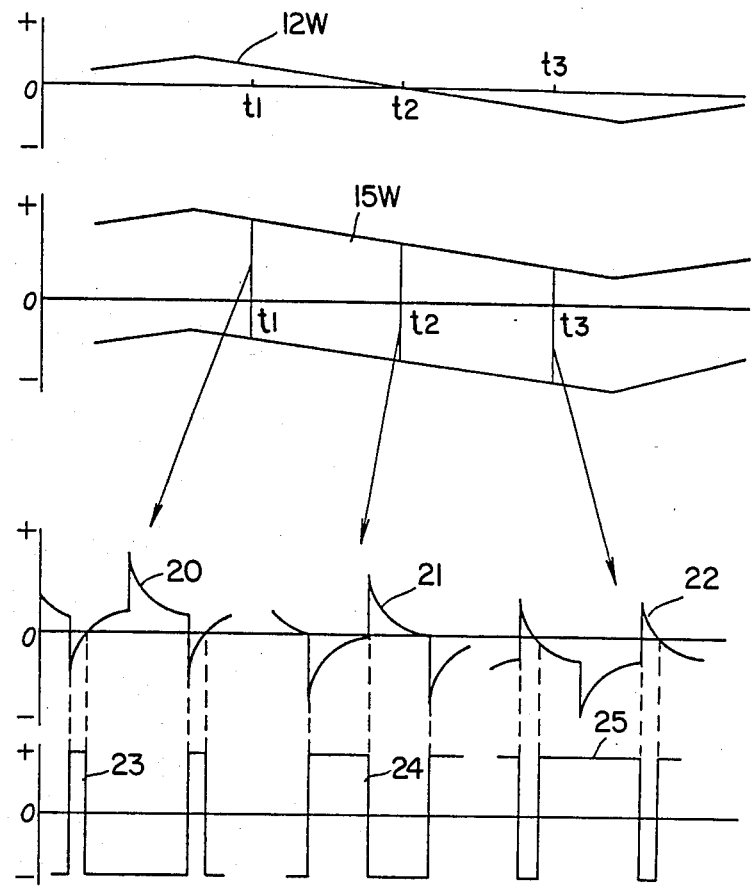
FIG. 5 is a waveform diagram for explanation of operation.

According to the present invention, even when the objective lens 10 is positioned at point S in FIG. 3, the collision of the objective lens 10 with the recording medium 9 is prevented. More particularly, when the objective lens 10 is at point S in FIG. 3, the extreme nonfocused condition of the light results in the sum of the a.c. component of outputs of the photo detectors $D_1$, $D_2$, $D_3$ and $D_4$ of the photo detector 1 is nearly zero, so that the output of the level detection circuit becomes zero to close the relay switch 17. On the other hand, from the triangular wave generation circuit 12 is produced a triangular wave of 12W shown in FIG. 5 and having a frequency of about 1 Hz, and from the square wave generation circuit 13 is produced a square wave of a frequency which is high to the extent that the objective lens system does not respond. The square wave is differentiated in the differentiation circuit 14 and then, together with the triangular wave, is added in the addition circuit 15, from which is provided a summation waveform illustrated by the waveform envelope 15W in FIG. 5 and applied to a negative input terminal of the amplifier circuit 6 through the switch 17. Time expanded waveforms 20, 21 and 22 illustrate waveforms resulting from expansion of the time base of waveform 15W at times $t_1$, $t_2$ and $t_3$, respectively. When the objective lens 10 is in the region of point S producing a focus error voltage from the differential amplifier of zero, the waveform 15W is passed by closed switch 17 to the inverting input of the amplifier circuit 6. The amplifier circuit 6 produces waveforms 23, 24 and 25 from the waveforms 20, 21 and 22 to control the drive circuit 7 in accordance with the difference between the positive and negative pulse widths of waveforms 23, 24, and 25 causing current to flow in the coil 8. In the vicinity of time $t_1$, the negative pulse width is larger than the positive pulse width, so that an average force is exerted by coil 8 in a direction of moving the objective lens 10 away from the recording medium 9. In the vicinity of time $t_2$, the objective lens 10 does not move relative to the recording medium 9 because the positive and negative pulse widths are equal to each other. At time $t_3$, the positive pulse width is larger than the negative pulse width, so that an average force is exerted by coil 8 in a direction of moving the objective lens 10 toward the recording medium. Thus, the control voltage applied to the amplifier circuit 6 controls current flow in the coil 8 through the drive circuit 7 by a voltage with varying pulse widths, so that the average current flowing in the coil 8 can be finely controlled. It becomes possible to select the amplitude value of the waveform 15W (see FIG. 5) in a range in which the objective lens 10 does not strike against the recording medium 9, and it is possible to let the objective lens 10 gradually approach the recording medium 9 and move it to the region c-o-a (see FIG. 3) where the focus error voltage occurs. When the objective lens reaches the above region, the focus error voltage at the output terminal of the differential amplifier circuit 4 takes over the control of the movement of the objective lens 10 to the focal position.

Focusing of the light results in the increase of the signal applied to the level detection circuit 16 causing the relay switch 17 to open and interrupt the waveform signal 15W to the amplifier 6. The objective lens 10 is held in the focal position 0 by the automatic focus control.

Although in the above embodiment the waveform 15W is obtained by differentiating a high frequency square wave of 50% duty ratio and summing with a triangular wave of low frequency, a high frequency triangular wave of the same frequency may replace the differentiated high frequency square wave and may be summed with the triangular wave of low frequency to attain the same effect as in the above embodiment.

According to the present invention, as set forth hereinabove, a precise adjusting mechanism or the like for moving the entire objective lens system is not required, so that the system can be manufactured less expensively.

What is claimed is:

1. An automatic focusing system comprising:
   (a) an objective lens for condensing light incident on and reflected from the surface of a recording medium;
   (b) electromagnetic drive means responsive to a focus error signal being positive or negative for driving said objective lens in respective opposite directions along an optical axis;
   (c) automatic focus control means for supplying said electromagnetic drive means with the focus error signal when the objective lens is in a normal range of lens positions to normally maintain a focused light condition;
   (d) a tringaular wave signal generation circuit for generating low frequency triangular wave signals;
   (e) a high frequency signal generation circuit for generating high frequency signals to which said electromagnetic drive means is not responsive;
   (f) a differentiation circuit for differentiating said high frequency signals from said high frequency signal generation circuit;
   (g) an adder circuit for adding said low frequency triangular wave signals from said triangular wave signal generation circuit and the output signals from said differentiation circuit to form a summation drive signal;
   (h) means for supplying said electromagnetic drive means with said summation drive signal from said adder circuit while said objective lens is outside of said normal range of lens positions.

2. An automatic focusing system as claimed in claim 1, wherein said electromagnetic drive means comprises a drive circuit including transistors and a coil.

3. An automatic focusing system as claimed in claim 1, further comprising detector means for detecting a condition indicating the normal range of lens positions for said automatic focus control means to control operation of said supplying means (h).

4. An automatic focusing system as claimed in claim 3, wherein said detector means includes a level detection circuit which produces an output signal in accordance with an alternating component of reflected light from said recording medium.

* * * * *